(12) United States Patent
Stapp et al.

(10) Patent No.: US 7,910,024 B2
(45) Date of Patent: Mar. 22, 2011

(54) CORROSION INHIBITION COMPOSITIONS AND METHODS FOR USING THE SAME

(75) Inventors: William E. Stapp, Santa Rosa, CA (US); Gary Westlund, Pleasanton, CA (US)

(73) Assignee: A.S. Inc., Santa Rosa, CA (US)

( * ) Notice: Subject to any disclaimer, the term of this patent is extended or adjusted under 35 U.S.C. 154(b) by 598 days.

(21) Appl. No.: 11/899,768

(22) Filed: Sep. 7, 2007

(65) Prior Publication Data

US 2009/0069202 A1 Mar. 12, 2009

(51) Int. Cl.
C09K 15/30 (2006.01)
C09K 15/32 (2006.01)
C09K 15/06 (2006.01)
C09K 8/54 (2006.01)
C23F 11/14 (2006.01)
C23F 11/18 (2006.01)

(52) U.S. Cl. .................. 252/389.22; 252/388; 252/399; 252/389.23; 252/400.22; 252/400.23; 422/15; 422/16; 106/14.12; 106/14.21; 148/250; 148/260; 148/261; 507/224; 507/237

(58) Field of Classification Search ............. 252/389.22, 252/389.23, 400.22, 400.23; 106/14.12, 106/14.21; 422/15, 16, 19
See application file for complete search history.

(56) References Cited

U.S. PATENT DOCUMENTS

| | | | |
|---|---|---|---|
| 3,962,109 A * | 6/1976 | Oberhofer et al. ............. 252/75 |
| 4,162,161 A * | 7/1979 | Shimamura et al. .......... 430/379 |
| 4,226,846 A * | 10/1980 | Saklad ......................... 424/1.37 |
| 4,253,912 A | 3/1981 | Becker et al. |
| 4,501,615 A | 2/1985 | Reeder et al. |
| 4,512,552 A * | 4/1985 | Katayama et al. ....... 252/389.51 |
| 4,681,670 A | 7/1987 | Nobel et al. |
| 5,021,324 A * | 6/1991 | Jargiello et al. ............... 430/331 |
| 5,202,028 A | 4/1993 | Kermer et al. |
| 5,487,906 A | 1/1996 | Dixit et al. |
| 5,491,048 A | 2/1996 | Anderson et al. |
| 5,510,057 A | 4/1996 | Riggs |
| 5,578,293 A | 11/1996 | Prencipe et al. |
| 5,942,052 A | 8/1999 | Kamimura et al. |
| 5,989,322 A * | 11/1999 | Riggs, Jr. ..................... 106/14.44 |
| 6,001,156 A * | 12/1999 | Riggs, Jr. ..................... 106/14.44 |
| 6,200,529 B1 | 3/2001 | Riggs |
| 2006/0118761 A1* | 6/2006 | Stapp ........................... 252/175 |

OTHER PUBLICATIONS

Inetrnational Search report and Written Opinion for PCT application PCT/US2008/010499, search report dated Feb. 25, 2009, 14 pages (2009).

Lim, James K., "Precipitate-Free, Dilute Aqueous Solutions of Stannous Fluoride for Topical Application: I. Simple and Mixed Mediums", *Journal of Dental Research*, 49(4):760-767 (1969).

Subramanian, G. et al., "Technetium-99m-Methylene Diphosphonate—A Superior Agent for Skeletal Imaging: Comparison with other Technetium Complexes", *Journal of Nuclear Medicine*, 16(8):744-755 (1975).

* cited by examiner

*Primary Examiner* — Joseph D Anthony
(74) *Attorney, Agent, or Firm* — King & Spalding LLP; Peter J. Dehlinger

(57) ABSTRACT

Compositions and methods are described for inhibiting corrosion of corrodible metals present in contact with water in cooling water and other water storage systems. The compositions include concentrated stannous salts and agents to solubilize such salts.

16 Claims, No Drawings

CORROSION INHIBITION COMPOSITIONS AND METHODS FOR USING THE SAME

FIELD OF THE INVENTION

The present invention relates to methods for inhibiting corrosion of corrodible metals in contact with water, such as boiler water or cooling water.

BACKGROUND OF THE INVENTION

Metal surfaces in cooling water systems and boilers are subject to high levels of corrosion due to various factors, including the high temperatures to which the metals are exposed. Heat exchanger surface (skin) temperatures can reach about 200° F., which accelerates the chemical reactions resulting in corrosion. In addition, the water used in such systems is often of moderately high alkalinity (about pH 8-9) and high hardness, having very high levels (e.g. about 200 ppm or more) of dissolved metal cations such as calcium and magnesium.

Conventionally, cooling water in such systems is treated with phosphate-based corrosion inhibitors, which react with dissolved calcium to form calcium phosphate, which forms a precipitate/barrier deposit on the metal surface. Care must be taken, however, not to overfeed the phosphate, as too thick a layer of calcium phosphate impairs heat transfer. Typically, heat transfer degrades over time, and the affected equipment must be disassembled and cleaned periodically.

SUMMARY OF THE INVENTION

The following aspects and embodiments thereof described and illustrated below are meant to be exemplary and illustrative, not limiting in scope.

In one aspect, a concentrated solution for adding to cooling water to reduce corrosion and scaling is provided, comprising 1-15% stannous salts and a bifunctional solubilization factor, wherein the bifunctional solubilization factor functions as a chelator for stannous ions and as an anti-scalant. In some embodiments, the solution provides adequate corrosion and scaling reduction to be used in the absence of an additional corrosion and/or anti-scaling agent.

In some embodiments, the bifunctional solubilization factor is selected from 1-hydroxyethylidene-1,1-diphosphonic acid (HEDP) or its water soluble salts, a terpolymer, or a copolymer. In some embodiments, the bifunctional solubilization factor is HEDP or a water soluble salt, thereof.

In some embodiments, the concentrated stannous solution comprising a bifunctional solubilization agent is adjusted to a final pH of greater that 5. In preferred embodiments, the pH is adjusted using potassium hydroxide (KOH).

In some embodiments, the amount of HEDP in the solution is from about 1.25% to about 15% (wt/wt). In some embodiments, the amount of HEDP in the solution is about 4% to about 6% (wt/wt). In some embodiments, the amount of HEDP in the solution is about 4.8% (wt/wt). In some embodiments, the amount of stannous salt in the solution is from about 3% to about 5% (wt/wt).

In other embodiment, the bifunctional solubilization factor is selected from a terpolymer and a copolymer.

In some embodiments, the concentrated stannous solution comprising a bifunctional solubilization agent is adjusted to a final pH of greater that 5. In preferred embodiments, the pH is adjusted using potassium hydroxide (KOH).

In some embodiments, the amount of bifunctional solubilization factor in the solution is from about 1.25% to about 15% (wt/wt). In some embodiments, the amount of bifunctional solubilization factor in the solution is from about 4% to about 6% (wt/wt). In some embodiments, the amount of stannous salt in the solution is from about 3% to about 5% (wt/wt).

In some embodiments, the terpolymer or copolymer comprises carboxylate and sulfonate functional groups.

In some embodiments, the terpolymer comprises acrylic acid, acrylamidosulfonic acid, and terbutylacrylamide, and the copolymer comprises acrylic acid and acrylamidosulfonic acid. In some embodiments, the stannous solution additionally comprising an organic acid. In particular embodiments, the organic acid is selected from citric acid, maleic acid, and polymaleic acid.

In some embodiments, the stannous solution further comprising an azole corrosion inhibitor compound. In some embodiments, the azole is present at a concentration of from about 2% to about 3% (wt/vol). In particular embodiments, the azole is tolyltriazole.

In a related aspect, a composition is provided comprising:
stannous chloride at a concentration of from about 2% to about 4%, and
a bifunctional solubilization factor selected from HEDP, a terpolymer, and a copolymer. In some embodiments, the composition further comprising tolyltriazole at a concentration of about 2% to about 3%.

In another related aspect, a concentrated composition for inhibiting corrosion of corrodible metal in contact with water in a cooling water system is provided, comprising a stannous salt and a bifunctional solubilization factor, wherein the bifunctional solubilization factor allows the stannous salt to be present at higher concentration than in the absence of the bifunctional solubilization factor and provides additional activity as an anti-corrosion and/or anti-scaling agent. In some embodiments, the composition provides adequate corrosion and scaling reduction to be used in the absence of an additional corrosion and/or anti-scaling agent.

In some embodiments, the bifunctional solubilization factor is HEDP. In some embodiments, the bifunctional solubilization factor is a terpolymer or copolymer. In some embodiments, the final pH of the composition is greater than about 5.

In another aspect, a method for preparing a concentrated stannous salt composition is provided, comprising
adding acid to water,
adding a stannous salt to the acidified water,
adding a bifunctional solubilization factor to the acidified water comprising a stannous solution, and
adjusting the pH to between 2.6 and 9.

In some embodiments, the final pH of the concentrated stannous salt composition is greater than about 5.

In some embodiments, the stannous salt is stannous chloride and the bifunctional solubilization factor is 1-hydroxyethylidene-1,1-diphosphonic acid (HEDP) or its water soluble salts.

In some embodiments, the stannous salt is stannous chloride and the bifunctional solubilization factor is a terpolymer or copolymer comprising acrylic acid and acrylamidosulfonic acid. In particular embodiments, the composition further comprises citric acid, maleic acid, or polymaleic acid.

In a related aspect, a method for preparing a concentrated stannous salt composition is provided, comprising adding a bifunctional solubilization factor to water, and adding a stannous salt to the water containing the bifunctional solubilization factor.

In some embodiments, the final pH of the concentrated stannous salt composition is greater than about 5.

In some embodiments, the stannous salt is stannous chloride and the bifunctional solubilization factor is 1-hydroxyethylidene-1,1-diphosphonic acid (HEDP) or its water soluble salts.

In some embodiments, the stannous salt is stannous chloride and the bifunctional solubilization factor is a terpolymer or copolymer comprising acrylic acid and acrylamidosulfonic acid.

In some embodiments, the stannous salt is stannous chloride and the bifunctional solubilization factor is a terpolymer or copolymer comprising a linear alkyl-aryl sulfonate and weak acid carboxylate.

In particular embodiments, the terpolymer is ACCUMER 3100 and the copolymer is ACCUMER 2100.

In some embodiments, the composition further comprises citric acid, maleic acid, or polymaleic acid.

These and other objects and features of the invention are made more fully apparent in the following detailed description of the invention.

DETAILED DESCRIPTION OF THE INVENTION

I. Definitions

"Corrosion" of a metal in contact with water, as used herein, refers to degradation of the metal due to chemical reaction with its environment, in this case, water and substances present in the water, including air. Such corrosion ultimately leads to dissolution or dispersion of the metal or metal compound in the water, observed as a loss of mass of the metal.

A "non-carbon" acid is an acid containing no carbon atoms, e.g. hydrochloric, sulfuric, phosphoric, or nitric acid.

As used herein, an "aqueous solution" refers to a composition in water. The composition may include an acid, e.g. HCl, $H_2SO_4$, or $HNO_3$, to promote dissolution of the stannous salt. There are no other components in any appreciable concentration, including organic molecules that can serve as a carbon source for microorganisms.

A "composition consisting essentially of" a stannous salt of a non-carbon acid (or aqueous solution) refers to the stannous salt, or aqueous solution, in combination with one or more optional components which do not materially affect the metal corrosion inhibiting characteristic(s) of the composition. Such components would typically be substances added to a distributive water stream for purposes other than inhibition of corrosion, as defined above. For example, dispersing or chelating agents, such as soluble anionic polymers (e.g. polyacrylates or acrylate copolymers), or nonionic or ionic surfactants, may be employed to reduce scale formation on solid surfaces; biocides may be added to reduce microbial growth.

A similar definition applies to compositions "consisting essentially of" a stannous salt of a non-carbon acid (or aqueous solution) and an alkali metal phosphate. Such compositions may also include components present for purposes other than inhibition of corrosion.

A "concentration of stannous salt which corresponds to a concentration of tin" in a given concentration range is determined from the relative molecular weights of the components. For example, 1.0 parts per million (ppm) tin corresponds to approx. 1.8 ppm $SnSO_4$, 1.6 ppm $SnCl_2$, or 2.3 ppm $SnBr_2$.

As used herein, "cooling water" refers broadly to recirculated water used to cool equipment, boiler water, water in storage tanks, sprinkler systems, etc. While the present compositions and methods are well suited to treating high temperature water in contact with corrodible surfaces, they are also suitable for treating water at room temperature or below.

As used herein, "treatment" or "treating" refers to adding the concentrate to a subject body or volume of water to reduce corrosion of corrodible metals.

As used herein, a "concentrate" is a solution or suspension of agents that is diluted in a body or volume of water to achieve a preselected final concentration of the agents. Ideal concentrates have the minimum amount of water necessary to solubilize the agents or maintain the agents in suspension such that, upon dilution, the agents are solubilized.

As used herein, the expression "providing adequate corrosion and scaling reduction to be used in the absence of an additional corrosion and/or anti-scaling agent," means providing a level of corrosion and scaling reduction characteristic of a corrosion inhibitor and a separate anti-scaling agent. The protection need not be absolute, only consistent with that provided by a typical combination of corrosion and scaling agents.

II. Stannous Salt Concentrates for Corrosion Inhibition

As noted above, metal surfaces in cooling water systems are subject to high levels of corrosion due to various factors, including the high temperatures to which the metals are exposed. Heat exchanger surface (skin) temperatures can reach about 200° F., which accelerates the chemical reactions resulting in corrosion. Bulk water temperature of cooling water in contact with such surfaces typically reaches about 140° F.

The present compositions provide a water treatment concentrate comprising a stannous salt and a bifunctional solubilization factor (herein, "solubilization factor"). The stannous salt is selected from, e.g., stannous chloride, stannous bromide, stannous fluoride, stannous iodide, stannous oxide, stannous phosphates, and stannous sulfate. In particular embodiments the stannous salt is stannous chloride. The concentration of the stannous salt in the concentrate is from about 1% to about 15% (wt/wt), from about 2% to about 15%, from about 3% to about 10%, or even from about 3% to about 5%, with a final diluted concentration of from about 0.05 to about 75 ppm, and preferably from about 0.1 to about 20 ppm, in the water to be treated.

Preferred stannous salt concentrates are near saturation to maximize the benefit of the compositions and methods. However, stability and storage requirements may require that the stannous concentrate is safely below saturation to prevent precipitation.

Without being limited to theory, it is believed that certain agents, such as HEDP and terpolymers/copolymers, function as bifunctional solubilization factors to solubilize the stannous salts and hold them in suspension by chelation, thereby permitting the preparation of a concentrated stannous solution, in some cases at a pH higher than that at which stannous ions normally precipitate, i.e., >2.5. Upon dilution in cooling water, the stannous salts dissociate from the solubilization factors, becoming available to treat the water.

In addition to solubilizing stannous ions, these bifunctional solubilization factors also provide and additional benefit, for example, anti-scaling, anti-corrosion, or dispersant activity that is independent of the presence of stannous ions.

The concentrated stannous salt compositions are effective, at relatively low concentrations, to inhibit corrosion of metals under conditions of high temperature, as noted above, and do not precipitate on the surface, as do conventional phosphate based inhibitors. The compositions are effective to inhibit corrosion of ferrous metals, such as carbon steel, as well as other metals such as copper, lead, and brass. The stannous salt compositions may also operate to remove existing corrosion product from steel surfaces, as stannous ion reduces ferric ion ($Fe^{+3}$) to ferrous ion ($Fe^{+2}$). In some embodiments, the aqueous stannous salt compositions do not contain any organic solvents or other organic components, and thus do not promote growth of microorganisms.

Particular bifunctional solubilization factors for use in preparing stannous salt concentrates are described, below.

A. Phosphorous-Containing Solubilization Factors

In some embodiments, the bifunctional solubilization factor is one or more organic phosphorous compounds, which include phosphonates and organophosphorous carboxylic acids and their salts. These agents function as crystal modifiers to reduce precipitations of water-borne contaminants, and are used as anti-scaling agents (anti-scalants).

Suitable phosphonates have the following general structure, where wherein $R_8$ is C1-C5 alkyl or substituted alkyl, including an amine substituted alkyl and phosphonic acid substituted alkyl:

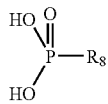

Exemplary phosphonates, include aminomethylenephosphonic acid, 2-phosphonobutane-1,2,4-tricarboxylic acid (PBTCA; Shandong Taihe, China), aminotrimethylene phosphonic acid (ATMP), ethylenediaminetetra(methylene phosphonic acid) sodium (EDTMPS), 2-hydroxyphosphonocarboxylic acid (HPAA), 1-hydroxyethylidene-1,1-diphosphonic acid (HEDP; Solutia, St. Louis, Mo., USA; Buckman Labs., Memphis, Tenn., USA; Parchem Trading, Ltd., CAC SHANGHAI, Inc.), phosphinopolycarboxylic acid (PCA; e.g., Acumer 4161, (Rohm and Haas), polyaminopolyethermethylene phosphonate (PAPEMP), and their water soluble salts.

In particular embodiments the solubilization factor is HEDP or a salt, thereof. In another particular embodiment, the solubilization factor is PBTCA or a salt, thereof. The final diluted concentration of HEDP or PCTCA should be from about 0.1 to about 25 ppm. The structures of PBTCA and HEDP are shown, below:

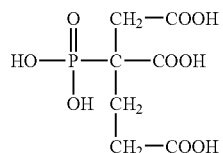
PBTCA

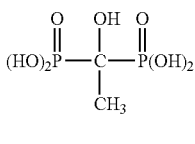
HEDP

The solubilization factor can also be an organophosphorous carboxylic acids. Suitable organophosphorous carboxylic acids have the following general structure, where wherein $R_9$ and $R_{10}$ are, independently, hydrogen, C1-C5 alkyl, or C1-C5 alkyl substituted by an amine, carboxylic acid group, or ester group. In use, since the final composition is alkaline, the compound will typically be present as an alkali or alkaline earth metal salt or C1-C5 alkyl ester:

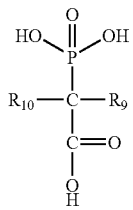

In preferred embodiments, the concentration of the phosphonate or organophosphorous carboxylic acid is from about 1.25% to about 15% (wt/wt), from about 2% to about 10%, from about 3% to about 7%, or from about 4% to about 6% in the concentrate, with a final diluted concentration of from about 0.03 to about 60 ppm, or even 0.1 to about 25 ppm.

Where the solubilization factor is HEDP, about 1.26 g HEDP is sufficient to solubilize 1 g of stannous salts. However, the compositions and methods may provide an excess of HEDP, to avoid stannous salt precipitation under different storage conditions, to increase the shelf life of the concentrate, and/or to provide additional anti-scaling activity. For example, an up to 3:1 HEDP:stannous salt ratio is expected to provide similar results. Additional HEDP (i.e., >3:1) is unlikely to provide further benefit at increased cost and phosphate levels. Note that HEDP may be provided as a solution with a specified activity, in which case the actual wt/wt amount of total HEDP may be greater to account for the less-than-100% activity. Other phosphonates or organophosphorous carboxylic acids may be provided at a similar excess.

Stannous chloride typically precipitates at a pH>2.5. For example, a method for precipitating tin from solution involves increasing the pH of a solution from about 2.0 to about 3.5, which results in precipitation of over 99% of tin from solution (U.S. Patent Pub. No. 20020119085).

In some embodiments, the final pH of the present concentrated stannous solution comprising a solubilization factor is adjusted to be between about 2.6 and 9. In some embodiments, the pH is greater than about 5. Providing a concentrate at close to neutral pH simplifies handling and avoids changing the pH of the cooling water upon addition of the concentrate. An exemplary pH range for the final stannous salt concentrate is from about 5 to about 9, or even from about pH 6 to about pH 7. Exemplary pH values are 5.0, 5.5, 6.0, 6.5, 7.0, 7.5, and 8.0. Potassium hydroxide is used to adjust pH.

Using one or more bifunctional solubilization factors to prepare a stannous salt concentrate provides several advantages over conventional stannous solutions, including the ability to prepare a concentrated stannous salt composition, optionally at near neutral pH, and having anti-scaling activity without the addition of an additional discrete anti-scaling agent.

B. Terpolymer and Copolymer Solubilization Factors

In some embodiments, the solubilization factor is one or more terpolymers or copolymers. Terpolymers or copolymers are known in the art and described, in e.g., U.S. Pat. Nos. 4,756,881, 5,030,748, 5,112,905, and 5,601,754. In some embodiments, one or more terpolymers or copolymers may be used in combination with an organic acid, such as citric acid or polymaleic acid.

Exemplary terpolymers or copolymers are listed in the following table.

| Polymer | Components | Example(s) |
|---|---|---|
| PAA | polyacrylic acid | GOOD-RITE K-732 (B. F. Goodrich) |
| PMA | polymaleic acid | BELCLENE 200 (BWA) |
| MA/SS | maleic acid/styrene sulfonic acid | Versa TL-4 (National Starch) |
| AA/AMPS | acrylic acid, acrylamidosulfonic acid | TRC-233 HS (), Belclene 400 (BioLabs), ACCUMER 2100 (Rohm and Haas) |
| AA/MA/NI | acrylic acid/maleic acid/non-ionic surfactant | AQUATREAT AR-980 (Alco) |
| AA/SPME/NI | acrylic acid/sulfophenylmethallyl ether/non-ionic surfactant | AQUATREAT AR-540 and AR550 (Alco) |
| AA/AMPS/TBAM | acrylic acid/acrylamidosulfonic acid/terbutylacrylamide | ACCUMER 3100 (Rohm and Haas) |
| AA/AMPS/SS | acrylic acid/acrylamidosulfonic acid/styrene sulfonic acid | GOOD-RITE K-798 (B. F. Goodrich) |
| MA/EA/VA | maleic anhydrid/ethyl acrylate/vinyl acrylate | BELCLENE 283 (BWA) |
| AA/AMPS/SSS | acrylic acid/AMPS/sulfonated sodium styrene. | GOOD-RITE K-797 and K-798 (B. F. Goodrich) |

The terpolymer or copolymer is preferably present at about 2% to about 15% (wt/wt), from about 3% to about 10%, or even from about 3% to about 5%, in the concentrate. Preferred terpolymers are a combination of linear alkyl-aryl sulfonates with weak acid carboxylates, and surfactants. Preferred copolymers are a combination of linear alkyl-aryl sulfonates with weak acid carboxylates. Examples of such terpolymers and copolymers are ACCUMER 3100 and ACCUMER 2100, respectively (Rohm and Haas). Other examples are provided in the foregoing table and known in the art. Terpolymers/copolymers comprising sulfonated styrene maleic anhydride are also expected to produce satisfactory results.

Suitable nonionic (NI) surfactants include polysorbate esters, alcohol ethoxylates, and nonyl phenol ethoxylates. Suitable anionic surfactants include sulfonated surfactants, such as sodium octane-1-sulfate (e.g., BIOTERGE PAS-8S, Stepan Co., Northfield, Ill., USA) and sodium 2-ethylhexyl-sulfate (e.g., RHODAPON BOS, Rhodia Inc., Cranbury, N.J., USA). Nonionic and anionic surfactants are used to couple triazoles and clarify the solution.

The use of a terpolymer or copolymer may be preferable to the use of a phosphonate (e.g., HEDP), where the presence of phosphates in the cooling water is undesirable. For example, the use of phosphonates and similar compounds is typically avoided when significant levels of calcium are present in the cooling water. Calcium is known to precipitate phosphonates, including HEDP.

Terpolymers and copolymers may be combined with organic acids, such as carboxylic acids and sulphonic acids, to provide additional anti-scaling activity while avoiding phosphate-containing compounds. Organic acids include monocarboxylic acids, and dicarboxylic acids, polycarboxylic acids, monosulphonic acids, and disulphonic acids. Examples of suitable organic acids include citric acid, oxalic acid, malonic acid, propionic acid, tartaric acid, lactic acid, succinic acid, glutaric acid, adipic acid, pimelic acid, octanedioic acid, tartaric acid, malic acid, glutamic acid, maleic acid, polymaleic acid (PMA), fumaric acid, acrylic acid, ethyl acrylate, methacrylic acid, sulphonic acid, similar (meth)polyacrylates, and 2-phosphonobutane-1,2,4-tricarboxylic Acid (PBTCA). Such organic acids may be employed as free acids or as their alkali metal or alkaline earth metal salts.

Several organic acids, exemplified by citric acid, reduce chlorine induced corrosion and limescale formation. Citric acid, polymaleic acid, and PBTCA are crystal modifiers with respect to certain salts, such as calcium carbonate. Polymaleic acid (below) is available from, e.g., KELIEN Chemical Co., Ltd. and CCS. Chem. Co., Ltd. (China) and Chemos GmbH and Connect Chemicals GmbH (Germany).

In particular embodiments, an organic acid such as citric acid or PMA is used to prepare a stannous salt concentrate, which additionally possesses anti-fouling activity owing to the present of the organic acid. In some embodiments, the amount of organic acid used to solubilize the stannous salts is from about 1.25% to about 15% (wt/wt), from about 2% to about 10%, from about 3% to about 7%, or from about 4% to about 6% in the concentrate, with a final diluted concentration of from about 0.03 to about 60 ppm, or even 0.1 to about 25 ppm.

C. Additional Agents

Concentrated stannous compositions comprising a bifunctional solubilization factor may further include additional agents to reduce corrosion and scale. For example, in some embodiments, concentrated stannous compositions further includes an azole corrosion inhibitor compound, such as tolyltriazole, benzotriazole, or mercaptobenzothiazol. In preferred embodiments, the concentration of azole in the concentrate is from about 1% to about 4%, with a final concentration of from about 0.1 to about 15 ppm in the treated water. The solubility of the azole compound may depend on the pH of the stannous salt concentrate and coupling characteristics of further optional additional surfactant agents. Azole can be used in combination with terpolymers, copolymers, organic acids, and/or HEDP.

Additional agents that can optionally be added to the concentrate include but are not limited to detergent builders, anti-foaming agents, dispersants, anti-microbial agents (biocides or biostats), odor neutralizers, fragrances, dyes, thickening agents, bleaches, buffers, and enzymes. Further additives include boron, molybdenum, titanium, tungsten, and vanadium compounds, as well as alkali metal salts. In particular, the addition of boron and molybdenum may produce synergistic effects, and/or may be used as tracers.

III. Preparation of Aqueous Scaling Agent-Stannous Salt Concentrates

The present methods relate to preparing a water treatment concentrate, as described, herein.

In some embodiments, the methods contemplate adding a stannous salt to acidified water containing the bifunctional solubilization factor, and then adjusting the pH of the solution as desired. The solubilization factor need not be present in acidified water prior to adding stannous salts but is present before adjusting the pH of the concentrate. Potassium hydroxide is preferred for adjusting pH, in view of its solubility characteristics and non-association with the stannous system.

In other embodiments, the methods contemplate adding a bifunctional solubilization factor to water, and then adding a stannous salt to water containing the solubilization factor. Acidification of the water in not required. The resulting concentrate can be used as is or adjusted to a desired pH. As above, potassium hydroxide is preferred for adjusting pH:

In example of these embodiments, a molar ratio of at least 1.26 parts HEDP: 1-part stannous ion produced good results. Lower ratios produce turbid solutions and/or cause precipitation of the stannous salt. Higher ratios result in a more stable solution at higher cost. Similar ratios of terpolymers (e.g., sulfonate/carboxylate/nonionic) and copolymers (e.g., sulfonate/carboxylate) produce similar results.

Additional agents required or desired for function and performance of the water treatment in cooling water applications can be added upon neutralization of the aqueous solution with a base. Alternatively, additional agents may be added to the acidified water or stannous solution, provided that they do not interfere with the solubility of the stannous salt.

Alternatively, the present compositions may be prepared by adding acidified water to dry stannous salt or to premixed dry stannous salt and solubility factor. As above, the aqueous solution may be neutralized prior to adding other, optional agents.

IV. Exemplary Composition and Methods of Use

In support of the present compositions and methods, an exemplary composition was prepared and used to treat water in a cooling tower located at the Park Central Office Building in Denver, Colo., USA. A concentrate consisting of stannous chloride (3.5%), HEDP (4.8%), and tolyltriazole (2.3%) (i.e., referred to as AS-8310) was compared to a convention phosphonate inhibitor for the ability to control carbon steel corrosion. Removable mild steel coupons were used to monitor corrosion, which was measured as the amount of material lost (i.e., decrease in thickness) measured in mil (i.e., $1/1,000$ inch). The coupons were pre-treated (passivated) with the respective corrosion inhibitor prior to being placed in the cooling tower. The stannous concentrate was added to the cooling at a rate of 100 ppm based on blowdown. The treatment dosage was determined by measuring the levels of phosphonate. The target range was about 7-8 ppm phosphonate, which provided a tin concentration of about 3 ppm. Raw data are shown in the Table, below.

| Date In | Date Out | Days Exposed | CR* | Inhibitor |
| --- | --- | --- | --- | --- |
| Jul. 9, 2003 | Oct. 8, 2003 | 91 | 1.8 | Phosphonate |
| Oct. 8, 2003 | Jan. 27, 2004 | 111 | 1.8 | Phosphonate |
| Jan. 27, 2004 | Jun. 2, 2004 | 127 | 1 | Phosphonate |
| Jun. 2, 2004 | Sep. 24, 2004 | 114 | 0.88 | Phosphonate |
| Sep. 24, 2004 | Nov. 3, 2004 | 40 | 2.01 | Phosphonate |
| Jan. 5, 2005 | May. 4, 2005 | 119 | 0.58 | Phosphonate |
| Aug. 3, 2005 | Jan. 4, 2006 | 154 | 1.47 | Phosphonate |
| Feb. 15, 2007 | Mar. 29, 2007 | 42 | 0.29 | AS-8310 |
| Mar. 29, 2007 | Apr. 27, 2007 | 29 | 0.651 | AS-8310 |
| Apr. 27, 2007 | May. 24, 2007 | 27 | 0.339 | AS-8310 |
| May. 24, 2007 | Jun. 28, 2007 | 35 | 0.35 | AS-8310 |

CR* = corrosion rate in mils per year (i.e., 0.001"/year)

The presence of the stannous salt-HEDP inhibitor provided better protection against corrosion than the conventional phosphonate treatment, demonstrating the efficacy of the present compositions and methods. In particular, the corrosion rate of mild steel was about 0.3-0.65 mils per year in the presence of the stannous salt-HEDP inhibitor, compared to 0.58-2.0 mils per year using phosphonate. The stannous salt-HEDP inhibitor appeared to provide about 3 to about 6-fold better protection that phosphonate.

Observations in a related study using artificially elevated levels of calcium chloride, sodium bicarbonate, magnesium sulfate, and silica, indicated that corrosion of steel coupons in the presence of a stannous salt-HEDP inhibitor was limiting to etching, with reduced gouging and pitting compared to phosphonate (not shown). Observations also suggested that corrosion in the presence of the stannous salt-HEDP inhibitor followed a different profile (or curve) than corrosion in the presence of phosphonate. Protection in the presence of the stannous salt-HEDP inhibitor appeared to increase following an initial period of limited corrosion, suggesting that the use of the stannous salt-HEDP inhibitor would afford greater protection in long term studies/applications.

The substitution of a terpolymer, optionally in combination with citric acid, for HEDP, is expected to produce similar results using similar amounts of the stannous salt and the optional azole compound.

V. Utility

The ability to prepare concentrated stannous solutions for water treatment means that an end user is required to add a smaller volume to a given volume of water. This is an advantage where access to the water supply is difficult, where water must be drained from the supply prior to adding the concentrate, or where addition of a larger volume of a water treatment composition is undesirable. In addition, concentrated water treatment compositions requires less storage space, use less packaging material, and are easier to transport.

The ability to prepare concentrated stannous solutions for water treatment at neutral or near neutral pH further simplifies handling of the concentrate and avoids adding an acid solution to cooling water, thereby reducing its pH.

The use of an anti-scaling agent, anti-flocculating agent, or crystal modifier to prepare a concentrated stannous solution provides the additional benefits of such compounds without adding an additional or discrete anti-scaling agent, anti-flocculating agent, or crystal modifier.

One skilled in the art will recognize further embodiments and uses for the present composition and methods in view of the disclosure.

It is claimed:

1. A concentrated composition for adding to cooling water to reduce corrosion and scaling, comprising in an aqueous medium at a pH between 5-7,
    1-15% stannous salt a bifunctional solubilization factor, wherein the bifunctional solubilization factor functions as a chelator for stannous ions and as an anti-scalant, 1-4% of a triazole corrosion inhibitor, and a sulfonated surfactant at a concentration sufficient to clarify the composition.

2. The composition of claim 1, wherein the bifunctional solubilization factor is selected from 1-hydroxyethylidene-1,1-diphosphonic acid (HEDP) or its water soluble salts, a terpolymer, or a copolymer.

3. The composition of claim 1, wherein the bifunctional solubilization factor is HEDP or a water soluble salt, thereof.

4. The composition of claim 3, wherein the amount of HEDP in the solution is from about 1.25% to about 15% (wt/wt).

5. The composition of claim 3, wherein the amount of HEDP in the solution is about 4% to about 6% (wt/wt).

6. The composition of claim 1, wherein the bifunctional solubilization factor is selected from a terpolymer and a copolymer.

7. The composition of claim 6, having a pH of greater than 5.

8. The composition of claim 7, wherein the pH is adjusted using potassium hydroxide (KOH).

9. The composition of claim 6, wherein the amount of bifunctional solubilization factor in the solution is from about 1.25% to about 15% (wt/wt).

10. The composition of claim 6, wherein the amount of bifunctional solubilization factor in the is from about 4% to about 6% (wt/wt).

11. The composition of claim 10, wherein the amount of stannous salt in the solution is from about 3% to about 5% (wt/wt).

12. The composition of claim 6, wherein the terpolymer or copolymer comprises carboxylate and sulfonate functional groups.

13. The composition of claim 12, wherein the terpolymer comprises acrylic acid, acrylamidosulfonic acid, and terbutylacrylamide, and the copolymer comprises acrylic acid and acrylamidosulfonic acid.

14. The composition of claim 13, additionally comprising an organic acid.

15. The of claim 14, wherein the organic acid is selected from citric acid, maleic acid, and polymaleic acid.

16. The composition of claim 1, wherein the triazole is tolyltriazole.

* * * * *